United States Patent [19]
Harwood

[11] 3,740,462
[45] June 19, 1973

[54] AUTOMATIC CHROMA GAIN CONTROL SYSTEM

[75] Inventor: Leopold Albert Harwood, Somerville, N.J.

[73] Assignee: RCA Corporation, New York, N.Y.

[22] Filed: Apr. 10, 1972

[21] Appl. No.: 242,466

[52] U.S. Cl. .......... 178/5.4 AC
[51] Int. Cl. .......... H04n 9/48
[58] Field of Search .......... 178/5.4 AC, 5.4 HE, 178/5.4 MC, 5.4 SY; 330/30 D, 69

*Primary Examiner*—Robert L. Griffin
*Assistant Examiner*—F. I. Konzem
*Attorney*—Eugene M. Whitacre

[57] ABSTRACT

Cascaded first and second gain-controlled amplifiers are used in the chrominance channel of a color television receiver. The gain of the first amplifier is controlled by an ACC loop employing a noise-immune detector to detect color burst information. The gain of the second amplifier is controlled by the output of a peak detector which detects picture-interval information at the output of the second amplifier. An ACC system with improved performance during the reception of noisy signals results.

10 Claims, 2 Drawing Figures

AUTOMATIC CHROMA GAIN CONTROL SYSTEM

Figure 1:
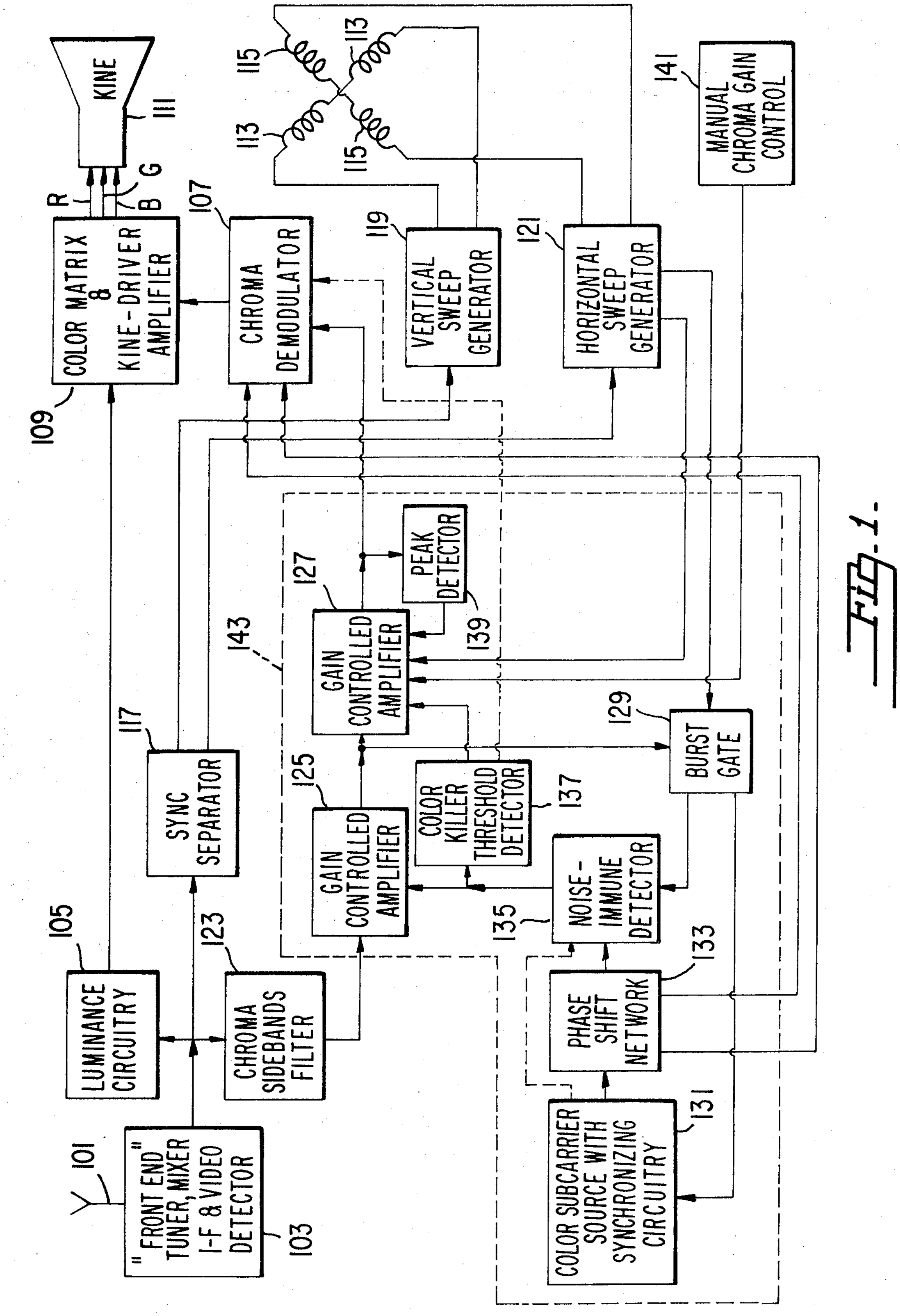

The present invention relates to color television receivers and more particularly to circuitry for providing improved automatic chroma control (ACC).

Automatic chroma control (ACC) is an automatic gain control system applied to a chroma amplifier in a color television receiver. The control system is conventionally responsive to burst information appearing in the horizontal blanking intervals of the chroma signal and acts to maintain the amplitude of the burst information in the output circuit of the chroma amplifier more nearly constant than at its input circuit. If each television broadcaster adheres to system standards concerning the relative levels of picture-chroma and burst information in its signals, the chroma signals will be maintained at the same color saturation level despite the viewer switching from one channel to another.

Too high a level of color saturation causes "oversaturation" — at least on peaks of the color signals kinescope — a condition in which the kinescope "blooms". "Blooming" is wheree the beam current in the kinescope increases so much that defocusing of the electron beam occurs and the color spot on the phosphor screen responsive to the electron beam is undesirably enlarged.

The ACC system desirably should provide for reducing chroma amplifier gain as the chroma signals become noisier, so that peaks of the combined chroma and noise signals will not cause oversaturation to occur. In an ACC system in which the burst information is detected by a noise-immune detector, unresponsive to noise accompanying the chroma signal, the chroma amplifier gain will not be reduced as the chroma signals become noisier. So undesirable oversaturation on peaks of noise is probable.

The detection of burst information for developing ACC signal may be done using a synchronous detector timed in response to the local color subcarrier source. The local color subcarrier source is itself synchronized with the incoming burst information which system may comprise, for example, automatic phase and frequency control (AFPC) or injection-locking of a crystal oscillator. Detection of the burst information by a synchronous detector provides an ACC substantially immune to noise signals accompanying the chroma signals to be controlled and will give rise to the problem of oversaturation during noisy signals.

However, in other ways a noise-immune ACC detector is desirable. It can provide, in combination with a simple threshold detector responsive to signals below a certain threshold level, for a noise-immune color killer circuit to disable the chroma demodulation processes during black and white television signal transmissions.

A noise-immune ACC detector is also advantageous when the local color subcarrier source is synchronized with burst information separated from chroma signal taken from the output circuit of the ACC'd chroma amplifier. This is because the burst information is not reduced in response to noisy signals, so synchronization of the local color subcarrier source is not consequently imparied. Further, a synchronous detector for developing ACC signal produces no gain reducing output until the local color source is brought into substantial synchronization with the burst information. This speeds the synchronization process.

Because of the advantages of using a synchronous detector for developing ACC signal, ways have been sought to augment its action with other circuitry to overcome its shortcomings. The picture-interval chroma information in the output signal of the ACC'd chroma amplifier may be detected to provide an ACC component signal to be added to the ACC component developed by the synchronous detector. This is disadvantageous to do when the local color subcarrier source is to be synchronized from the output signal of the ACC'd chroma amplifier, because the reduction of the signal during the reception of noisy signals impairs synchronization of the local color subcarrier source to the burst information contained therein.

Further, the detection of picture-interval chroma information to develop ACC information tends to produce control signals which are responsive to the chroma peaks of the broadcast scene, causing low-chroma scenes to have too high color saturation or high-chroma scenes to have too low color saturation. This is undesirable when strong, noise-free signals are being received.

An automatic chroma control system embodying the present invention includes a first chroma amplifier followed in cascade connection by a second chroma amplifier. The input circuit of the first amplifier is adapted to receive input chroma signals, having a burst information component and having a picture-interval information component, and provides in response thereto intermediate chroma signals at its output circuit. The second amplifier provides output chroma signals at its output circuit in response to intermediate chroma signals applied to its input circuit. A noise-immune detector means develops a control signal responsive to the amplitude of the burst information component of the input chroma signals. The control signal provided by the noise-immune detector means is applied to the first chroma amplifier to control its gain for chroma signals. A peak detector means develops a control signal responsive to peaks of the picture-interval component of the input chroma signals and accompanying noise. The control signal provided by the peak detector means is applied to the second chroma amplifier to control its gain for chroma signals.

When the noise level in the picture-interval component of the input chroma signals grows large enough to tend to cause peaks of the noisy output chroma signals to exceed the excursion permitted peaks of noise-free signals, the gain of the second amplifier is reduced by action of the peak detector means to maintain peaks of the noisy output chroma signals within the limits of excursion permitted peaks of noise-free signals. Accordingly, oversaturation during the reception of noisy signals is avoided. At the same time the noise immunity of the ACC of the first chroma amplifier is desirably unaffected.

The noise-immune detector is an amplitude detector in which the detector response for peaks of noise as compared to the response for the average level of burst information is less than that of a peak detector. Average detection, where the detector is responsive to the average energy of the signal peak detected rather than its peak energy, will provide for noise immunity since noise accompanying the burst information has a larger ratio of peak energy to average energy than the burst information itself does. Narrowing the bandwidth of the signals being admitted to an amplitude detector is an alternative or supplemental way to provide for noise immunity. Synchronous detection will afford additional noise immunity.

In a preferred embodiment of the present invention the peak detector means is provided with an offset threshold so that detection of peaks occurs only on peaks of the output chroma signals which exceed a certain threshold level, whereby the peak detection means is inoperative to reduce the gain of the second amplifier under conditions of reception by the television receiver of strong, noise-free television signals broadcast to proper standards.

In a further preferred embodiment of the present invention means are provided for manually controlling the gain of the second amplifier for chroma signals. The peak detector means operates to prevent oversaturation caused by setting the manual chroma gain control for too high gain.

Figure 2:
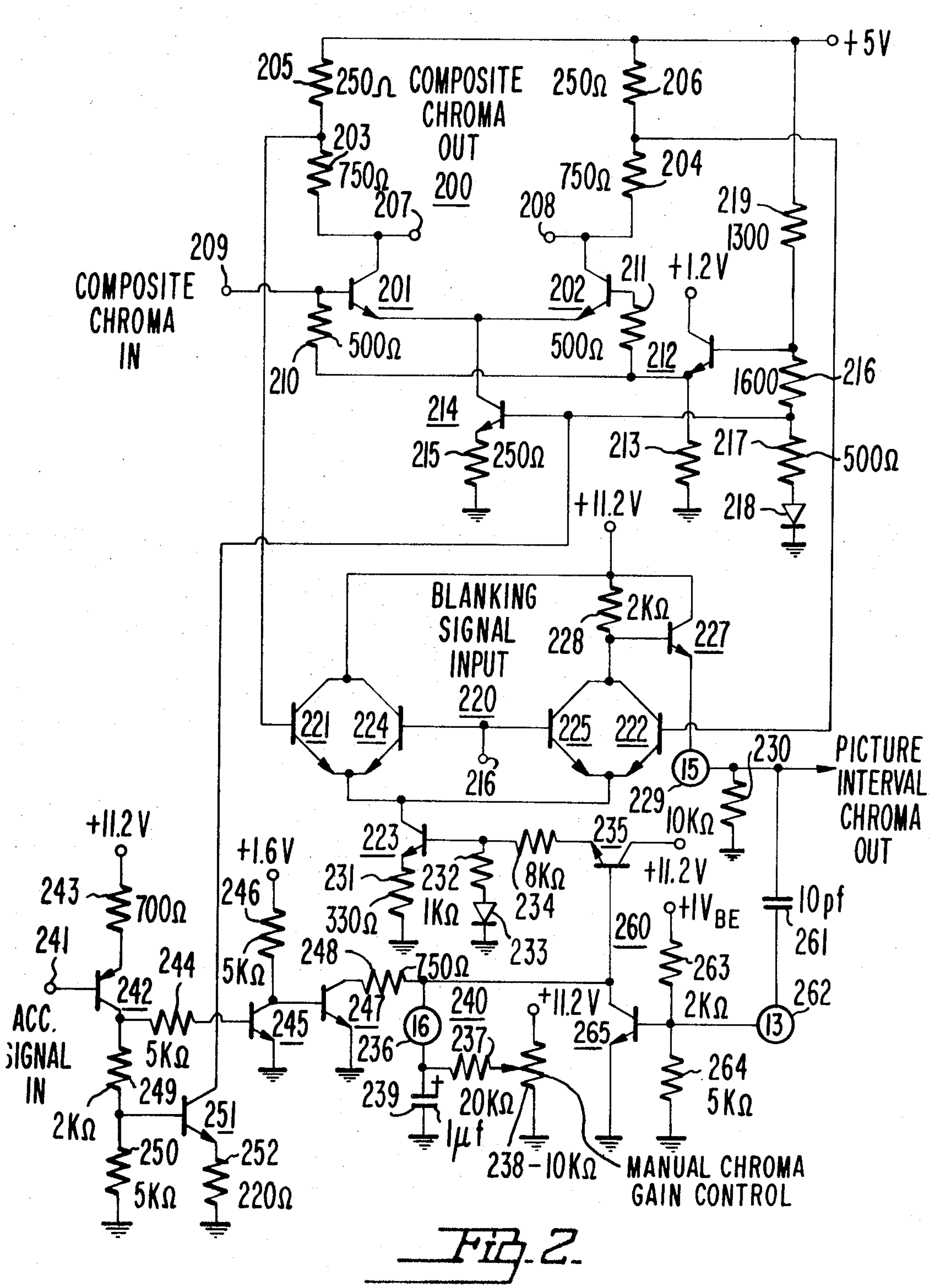

The advantages of the present invention will be better understood from the detailed description of the drawings in which:

FIG. 1 is a block schematic of the present invention shown in a representative type of color TV receiver, and FIG. 2 is a schematic of the cascaded first and second gain-controlled amplifiers and their associated circuitry as fabricated in integrated circuit form in a preferred embodiment.

Referring now to FIG. 1, television broadcast signals intercepted by an antenna 101 are applied to a "front end" 103 of the color television receiver comprising a tuner, mixer, intermediate-frequency amplifiers and video detector. Composite video signals from the video detector portion of "front end" 103 are applied as input signals to luminance circuitry 105 typically comprising trapping filters, contrast and brightness controls, and video amplifier stages. Output video signals from the luminance circuitry 105 and output color-difference signals from chroma demodulators 107 are combined and amplified in a color matrix and kinescope-driver amplifiers section 109. The output signals from the kinescope-driver amplifiers of the section 109 are red, green and blue drive signals which are applied to electrodes of a color kinescope 111. The color kinescope 111 is shown to have vertical magnetic deflection coils 113 and horizontal magnetic deflection coils 115.

Composite video signals from the video detector portion of the "front end" 103 are applied as input signals to a sync separator 117, which provides separated sync signals to a vertical sweep generator 119 and a horizontal sweep generator 121. The vertical sweep generator provides sweep signals to the vertical deflection coils 113; the horizontal sweep generator 121 provides sweep signals to the horizontal deflection coils 115.

Composite video signals from the video detector portion of the "front end" 103 are also applied to a chroma sidebands filter 123. Components of the composite video signals which are in the frequency range of the chroma sidebands, including those chroma sidebands, are selected by the filter 123 and applied as input signals to the gain-controlled amplifier 125. Output signals from the amplifier 125 are applied as input signals to another gain-controlled amplifier 127. Output signals from the amplifier 127 are applied to the chroma demodulators 107 as input signals to be detected.

Output signals from the amplifier 125 are applied as input signals to a burst gate 129. The burst gate 129 provides an output signal responsive to these signals during time intervals determined by gating pulses. These gating pulses are supplied to the burst gate 129 from the horizontal sweep generator 121. When the generator 121 is synchronized with the broadcast television signal, these gating pulses occur at intervals corresponding to the intervals in which burst information is present in the output chroma signals of amplifier 125, as applied to the input of burst gate 129.

The burst gate 129 provides separated burst signals, accordingly, during normal receiver operation. Separated burst signals from the burst gate 129 are applied to a local color subcarrier source with synchronizing circuitry 131 which provides a regenerated color subcarrier output signal timed in response to the separated burst signals. The source 131 may comprise a crystal oscillator synchronized by means of automatic phase and frequency control (AFPC) or by injection lock means, for example. The regenerated color subcarrier output signal from the source 131 is supplied to a phase-shift network 133, which provides appropriately phased color subcarrier signal outputs to time the chroma demodulators 107.

The burst gate 129 also provides separated burst signals to a noise-immune detector 135, which develops ACC signals therefrom for application to the amplifier 125 to control its gain for chroma signals. As the level of burst information at the output of the first amplifier tends to increase, the gain of the amplifier is reduced by the ACC signals. The noise-immune detector 135 may, for example, be a synchronous detector provided color subcarrier signals to time its detection processes either from the phase-shift network 133 as shown by solid connection or, alternatively, directly from the source 131 as shown by dotted connection. The ACC signals from the detector 135 may be applied to a color killer threshold detector 137, which provides a color kill instruction signal when the ACC signals at its input are smaller than a threshold level. This color kill instruction signal may be coupled to the amplifier 127 to reduce its gain substantially to zero, as shown by solid connection, or alternatively coupled to the chroma demodulators 107 to disable their operation, as shown by dotted connection.

The ACC of the first gain-controlled amplifier 125 will not sufficiently reduce its gain for chroma signals in response to accompanying noise, because of the noise-immunity of the detector 135. During the reception of weak, noisy signals the gain of the amplifier 125 will be increased to maintain the level of burst information in its output signal the same as when strong, noise-free signals are being received. The signal excursions of noise accompanying the chroma signals at the output of amplifier 125, a part of which noise is generated in the "front end" 103 of the receiver and a part of which is intercepted by the antenna 101, will exceed normal chroma signal excursions. Were the gain of the amplifier 127 fixed in value, oversaturation conditions would therefore obtain in the television receiver.

The output chroma signals from the amplifier 127 are supplied to a peak detector 139. The amplifier 127 may have gating pulses applied to it from the horizontal sweep generator, as shown, to reduce its gain to zero during horizontal blanking intervals or, alternatively, it may not. In either case, chroma is available during picture intervals at the output circuit of amplifier 127. The peak detector 139 is sensitive to peaks in the picture-interval chroma signals provided to it by amplifier 127 and develops a gain control signal in response thereto which is applied to control the gain of the amplifier 127. As the peaks in the picture-interval chroma tend to increase their excursion, the control signal provided by the peak detector 139 reduces the gain of the amplifier 127. The excessive signal excursions of noise accompanying the chroma signals, mentioned in the previous paragraph, cause the peak detector 139 to reduce the gain of amplifier 127. Therefore, the signal excursions of noise accompanying the output chroma signals of amplifier 127 will not exceed the normal signal excursions of strong, noise-free output chroma signals. Consequently, "blooming" of the color kinescope on noise peaks will be forestalled.

Cascading the gain controlled chroma amplifiers 125 and 127 and operating their gain control loops separately obviates the problem of the peak detector 139 being sensitive to the average chroma level of the scene during the reception of strong, noise-free signals if: 1. the maximum gain of the chroma amplifier 127 is correctly set, and 2. the peak detector 139 is made insensitive to signal excursions which do not exceed a certain threshold value. When these criteria are met, the normal level of strong, noise-free chroma signals maintained at the input of the amplifier 127 by the ACC of the amplifier 125 will never cause large enough signal excursions of the output chroma signals provided by the amplifier 127 to the peak detector 139 to develop a control signal to reduce the gain of amplifier 127. When receiving strong, noise-free television signals, the amplifier 127 will then operate at its predetermined gain. No control signals dependent upon picture interval chroma will be introduced into the ACC system.

A manual chroma gain control 141 may be connected to control the gain of the gain-controlled amplifier 127. Manual chroma gain controls are often mis-set by the viewer and when set for too high chroma gain will tend to cause blooming of the kinescope on objects having high color saturation. Placement of the manual chroma gain control prior to the output circuit of the amplifier 127 and the input circuit of the peak detector 139 permits the gain of the amplifier 127 to be reduced by a control signal from the peak detector 139 responsive to the overly large chroma signals. This automatic adjustment of the gain of the amplifier 127 will prevent kinescope "blooming" caused by mis-setting of the manual chroma gain control 141.

The peak detector 139 also acts to reduce the gain of the amplifier 127 if signals are received which depart from good broadcasting practice by reason of having insufficient burst information or excessive chroma modulation. This gain reduction prevents oversaturation during the reception of such signals.

The elements 125–139 shown enclosed by the dotted-line 143 are suitable for fabrication in primarily monolithic silicon integrated circuitry form. The burst gate 129 and noise immune detector 135 may be of the type referred to in the concurrently filed U.S. Pat. application Ser. No. 242,322, entitled "Detector Circuit With Self-Referenced Bias", filed in the name of the present inventor and assigned to RCA Corporation. The color subcarrier source with synchronizing circuitry may comprise a voltage-controlled crystal oscillator and an AFPC detector providing voltage to control the frequency of oscillations from the oscillator in response to separated burst signals provided by the burst gate 129. The AFPC detector may be of the type described in the concurrently filed U.S. Pat. Application Ser. No. 242,321 entitled "Electronic Signal Processing Circuit", filed in the name of the present inventor and assigned to RCA Corporation. It is desirable to provide to an integrated circuit AFPC detector input chroma signals taken from the output of an amplifier 125 provided with ACC from a noise-immune detector 135. This is because the constraint on operating supply voltages in an integrated circuit and the infrequency of burst information tend to make the AFPC detector output small with respect to direct-current biasing errors. This undesirable condition can be better tolerated if the detector is supplied as much input signal as possible without overloading the detector when the oscillator is synchronized to incoming burst information. The chroma signals at the output of the ACC'd amplifier 125 are suitably regulated in amplitude to provide these input signals.

FIG. 2 is a schematic diagram of integrated circuitry for performing the functions indicated by blocks 125, 127, 137, 139 and 141 of FIG. 1 in connection with the functions indicated by blocks 129, 131, 133, 135 as provided by the circuitry described in the previous paragraph. All elements shown except 230, 237–239 and 261 are considered within the confines of an integrated circuit, which is provided with terminals 229, 236 and 262 for connection to those external elements.

The first gain-controlled amplifier 200 is a differential amplifier employing emitter coupled NPN transistors 201 and 202. The second gain-controlled amplifier 220 is a differential amplifier employing emitter coupled NPN transistors 221 and 222. Resistive voltage dividers 203, 205 and 204,206 provide collector loads for the transistors 201 and 202, respectively, The base electrodes of transistor 221 and 222 are connected to respective ones of the resistive voltage dividers 203, 205 and 204, 206 to receive reduced output chroma voltages from the collector electrodes of transistors 201 and 202. This establishes a cascade connection for chroma signals of the amplifier 220 after the amplifier 200. The output chroma voltages at the collector electrodes of transistors 201 and 202, provided in response to composite chroma input signals applied to terminal 209 at the base electrode of transistor 201, are for application to the burst gate 129 and subsequently the noise-immune detector 135.

The resistive voltage divider formed by the series connection of resistors 219, 216, 217 and diode 218 between +5 volt operating supply and ground reference potential provides direct-current voltages intermediate therebetween for the biasing of the base electrodes of NPN transistors 212, 214. Direct-current bias for the base electrodes of transistors 201, 202 is provided via resistors 210, 211, respectively, from the emitter electrode of the common-collector transistor 212.

Emitter current is provided to the joined emitter electrodes of transistors 201, 202 from the collector electrode of an NPN transistor 214, which has its emitter electrode coupled to ground reference potential by a resistor 215. The collector current of the transistor 214 is varied, as explained below, to vary the gain of the gain-controlled amplifier 200.

Similarly, the gain of the second gain-controlled amplifier 220 is varied in response to the collector current variations of an NPN transistor 223, having its collector electrode connected to the joined emitter electrodes of NPN transistors 221, 222, 224 and 225. Transistors 224 and 225 have their base electrodes joined at a terminal 226 to which blanking signal input is applied. This blanking signal comprises positive-going pulses occurring during the horizontal blanking interval and swinging up from +2.5 volt to +5 volts. These positive-going pulses may be provided from the horizontal sweep generator 121 (shown in FIG. 1). When the base electrodes of the transistors 224 and 225 are at +2.5 volts, the more positive voltages at the base electrodes of transistors 221 and 222 cause the quiescent collector current of transistor 223 to flow in equal portions through themselves and they function as a gain-controlled differential amplifier. When the base electrodes of transistors 224 and 225 are at +5 volts, exceeding the voltages at the base electrodes of transistors 221 and 222, the quiescent collector current of transistor 223 is caused to flow in equal portions through the transistors 224 and 225. The diversion of current completely away from the transistors 221, 222 reduces their transconductance to zero and the gain of the emitter-coupled differential amplifier 220 they form to zero. This switching is unaccompanied by an appreciable direct potential shift at the base electrode of an NPN transistor 227 since the collector resistor connecting this point to the +11.2 volt operating supply conducts half the quiescent collector current flow of transistor 223, whether via the collector-to-emitter path of transistor 225 during the horizontal blanking interval or that of transistor 222 during the picture interval. The signal at the base electrode of transistor 227, is not composite chroma containing burst information then, but is picture-interval chroma signal, chroma signal from which the burst information has been removed. The transistor 227 is connected as an emitter-follower amplifier and so the picture-interval chroma signal appears at its emitter electrode which is connected to the output terminal 229.

The gain of the amplifier 220 for picture-interval chroma signals may be manually controlled by a potentiometer 238 labelled "MANUAL CHROMA GAIN CONTROL". The end terminals of potentiometer 238 are connected to the +11.2 volt operating supply and ground reference potential, respectively, and its slider arm terminal provides an adjustable potential therebetween coupled via resistor 237 to terminal 236 at the base electrode of NPN transistor 235. The potential at the emitter electrode of the emitter-follower transistor 235 is offset 0.7 volt approximately from the potential at its base electrode and is coupled via a resistive voltage divider comprising resistors 234, 232 and temperature-compensating diode 233 to the base electrode of the transistor 223. The emitter electrode of the transistor 223 is connected to ground reference potential by resistor 231, and the collector current of the transistor 223 is increased or decreased in response respectively to increase or decrease of the potential applied to its base electrode. Increasing the potential at the slider arm terminal of the potentiometer 238 increases the collector current of transistor 223 and consequently the gain of the amplifier 220 for picture-interval chroma signal. Decreasing the potential at the slider arm terminal decreases the gain of amplifier 220. The manual gain control system described in this paragraph provides the basic direct current biasing network to control the gain of the amplifier 220, the effects of which network are augmented to provide for color killer function and for gain control to avoid oversaturation. The capacitor 239 connected between terminal 236 and ground reference potential decouples any noise generated by slider arm movement of the potentiometer 238 from appearing at the base electrode of transistor 235 and affecting the gain of amplifier 220.

The gains of the gain-controlled amplifiers 200, 220 are affected by ACC and color killer delay circuitry 240 embodied in elements 241–251. The balanced chroma output provided from the terminals 207 and 208 is coupled to the input for signals to be detected of an in-phase keyed synchronous burst detector 131 (shown in FIG. 1), which provides ACC control signals which are coupled to the terminal 241 at the base electrode of a PNP transistor 242.

As the ACC signal supplied from the noise-immune synchronous detector 131 to terminal 241 approaches within approximately 600 millivolts of +11.2 volts, as will be the case when there is no detectable burst information the PNP transistor 242 is no longer biased into forward conduction. The collector electrode of the transistor 242 therefore no longer supplies base current to NPN transistor 245 through the resistor 244. Without base current, transistor 245 supplies no collector current to maintain a voltage drop across the resistor 246, which couples its collector electrode to a +1.6 volt potential. The base electrode of NPN transistor 247 connected to the collector electrode of transistor 245 seeks to rise to the +1.6 volt potential, which causes base current flow in transistor 247. Collector current flows in transistor 247 in response to its base current flow and causes a substantial voltage drop in resistor 237 and whatever resistance is offered by the potentiometer 238. The reduction of base voltage on transistor 235 is so substantial that it no longer supplies current to maintain transistor 223 in forward conduction. With no collector current from transistor 223, the gain of the differential amplifier 220 for chroma signals is reduced substantially to zero.

As detected ACC signal brings the potential at terminal 241 downward from +11.2 volts by more than the approximately 700 millivolts required to forward bias its base-emitter junction transistor 242 is biased into conduction. The consequent conduction of transistor 245 clamps the base electrode of grounded-emitter transistor 247 to ground reference potential. This prevents collector current flow in the transistor 247 and its modification of the potential at terminal 236, so the color killer circuitry exerts no influence on the gain of the amplifier 220.

The common-emitter amplifier transistors 242, 245, 247 thus function as a threshold detector providing output current from the collector electrode of transistor 247 only when the ACC signal developed by the noise-immune detector 131 exceeds a threshold amplitude of 700 millivolts, approximately, between terminal 241 and the +11.2 volt operating supply. Since the transistors 245 and 247 are grounded-emitter amplifiers with substantial forward gain, the switching into and out of color kill occurs over a small range of ACC signal potential. The capacitor 239 provides some additional noise immunity for the color killer, since sustained conduction of transistor 247 is required to discharge the capacitor 239 to kill the gain of the chroma amplifier 220. Sustained nonconduction of transistor 247 is required for capacitor 239 to charge when color is no longer killed.

The collector electrode of transistor 242 also is connected to the input terminal of a resistive voltage divider comprising resistors 249 and 250, the output terminal of which is connected to the base electrode of an NPN transistor 251. The emitter electrode of transistor 251 is coupled to ground reference potential by a resistor 252, and its collector electrode is connected to the base electrode of transistor 214.

The resistive divider 249, 250 prevents the application of sufficient voltage to the base electrode of transistor 251 to bias it into forward conduction to provide ACC control to the first gain-controlled amplifier 200 until the ACC signal applied to the input terminal 241 is more than large enough to bias transistor 245 into conduction, removing color kill from the amplifier 220. In the circuit shown in FIG. 2 color killer action is initiated when the output of the first gain-controlled amplifier 200 has fallen 6dB from the level maintained during operation of its ACC loop. The reason for doing this is best explained referring back to FIG. 1. If the amplitude of the burst information is in the composite chroma input signals to the amplifier 125 (corresponding to amplifier 200 in FIG. 2) is detected at a level below which ACC is exerted on the amplifier 125, the sensitivity of the burst detection process as carried out in the detectors 135, 137 is not reduced by that ACC action. This provides for better definition of the level of composite chroma input which will cause the threshold level of the threshold detector 137 (corresponding to transistor 245, resistor 246, transistor 247 in FIG. 2) to be exceeded by excursions of detected burst signal and which will subsequently cause color killer action to be inactivated. Accordingly, the need for a color killer threshold control is obviated.

The gain of the amplifier 220 is also controlled in response to peaks of the picture-interval chroma signal provided at the output terminal 229 which peaks are large enough to cause oversaturation in the television receiver and to result in blooming of the kinescope. A capacitor 261 having substantial capacitative reactance at color subcarrier frequency couples the picture-interval chroma from output terminal 229 to an input terminal 262 of the peak detector 260. The peak detector 260 comprises resistors 263 and 264 transistor 265, capacitor 239, and the resistance of resistor 237 and potentiometers 238.

The resistors 263, 264 provide the peak detector 260 with a threshold of response to input signals at terminal 262, so that it functions as a threshold peak detector. The terminal 262 is coupled by a resistor 263 to a 1 $V_{BE}$ (approximately 0.7 volt) supply, as conventionally may be provided across a forward-biased semi-conductor junction and is coupled by a resistor 264 to ground reference potential. The connection of resistors 263, 264 places a quiescent bias potential of approximately 450 or 500 millivolts on terminal 262 and the base electrode of the grounded-emitter NPN transistor 265 connected thereto. This quiescent bias potential is insufficient of itself by approximately 200 millivolts to bias transistor 265 into conduction. This provides a threshold of some 200 millivolts which peaks of signal at terminal 262 must overcome in order that transistor 265 be biased into substantial conduction. Peaks of the picture-interval chroma signal superimposed upon this quiescent bias potential, which correspond to peaks of picture-interval chroma signal at terminal 229 sufficiently large to cause oversaturation, will overcome this threshold and provide sufficient forward bias to the base-emitter junction of transistor 265 to bias it into conduction during the duration of these peaks.

The setting of the potentiometer 238 determines the quiescent control voltage on the capacitor 239 and therefore the quiescent charge upon the capacitor, which quiescent conditions obtain when the base electrode of transistor 265 is not supplied signals with peaks large enough to bias the transistor 265 into conduction. The conduction of the transistor 265 during larger peaks will remove charge from the capacitor 239, which charge is only slowly replenished through the bleeder resistance afforded by resistor 237 and potentiometer 238. Accordingly, the potential across the capacitor 239 is reduced. This reduces the potential at the base electrode of transistor 235, which as previously explained reduces the gain of the amplifier 220.

The peak detector 260 can be constructed so that rapid fluctuations of the gain of the amplifier 220 due to its control are avoided, which most viewers of a television receiver incorporating the circuitry shown in FIG. 2 prefer. The capacitance of the capacitor 239 is chosen to be large enough so that appreciably sustained conduction of transistor 265 over the period of a field of television signal (1/30 to 1/25 of a second) or a few fields on peaks of the picture-interval chroma signals is required to reduce the gain of the amplifier 220 substantially. That is, a period of time longer than the duration of a single short noise or chroma signal peak is required for the peak detector to charge to the level of recurring such peaks. As shown, the discharge of the capacitor 239 may be accomplished during a sustained interval of recurring overly large noise or chroma signal peaks more rapidly than the quiescent charge of the capacitor 239 will be replenished through the bleeder resistance afforded by resistor 237 and potentiometer 238. The replenishment of this charge will be over a period of several fields, as provided by choosing the bleeder resistance to be suitably large.

What is claimed is:

1. In a color television receiver an automatic chroma gain control system for processing input chroma signals having burst information and picture-interval information components, said system comprising, a first amplifier having an input terminal adapted to receive said input chroma signals, having an output terminal to provide intermediate chroma signals responsive to said input chroma signals, and having a gain between its said input and said output terminals which is controllable in response to first control signals;

noise-immune detector means having an input terminal and having an output terminal providing said first control signal in response to said burst information component coupled to its said input terminal, a second amplifier having an input terminal coupled to said output terminal of said first amplifier to receive said intermediate chroma signals, having an output terminal providing output chroma signals responsive to said intermediate chroma signals applied to its said input terminal, and having a gain between its said input and said output terminals which is controllable in response to second control signals, and peak detector means having an input terminal and having an output terminal to provide said second control signals in response to peak excursions of said picture-interval information component coupled to its said input terminal.

2. In a color television receiver an automatic chroma gain control system as claimed in claim 1 wherein said peak detector is characterized by being:

a threshold peak detector having an input terminal coupled to said output terminal of said second amplifier and having an output terminal providing a second control signal responsive only to peak excursions of signals applied to its input terminal which exceed a predetermined threshold level.

3. In a color television receiver an automatic chroma gain control system as claimed in claim 1 wherein said threshold peak detector comprises:

a capacitor across which said second control voltages are to be developed, means including a resistance, said means being coupled to said capacitor to determine its quiescent charge condition, semiconductor means coupled to said capacitor and biased into conduction by said peak excursions of signals which exceed a threshold level to modify said quiescent charge condition, the capacitance of said capacitor being chosen large enough that said modification takes place over a period of at least 1/30 second.

4. In a color television receiver an automatic gain control system as claimed in claim 3 wherein said resistance is chosen large enough that the return to said quiescent charge condition when said semiconductor means is no longer biased into conduction requires a time longer than said period.

5. In a color television receiver an automatic chroma gain control system as claimed in claim 1 wherein, manual chroma gain control means is coupled to said second amplifier to control its said gain, said peak detector means acting to reduce the likelihood of peak excursions of said output chroma signals causing oversaturation in said receiver, which otherwise tends to be caused by mis-setting of said manual chroma gain control means for too high second amplifier gain.

6. In a color television receiver an automatic chroma gain control system as claimed in claim 1 including:

a threshold detector having an input terminal coupled to said output terminal of said noise-immune detector and having an output terminal at which a color killer signal is provided in response to signals of less than a threshold amplitude applied to its said input terminal, said output terminal of said threshold detector being coupled to control said second amplifier to reduce its said gain substantially to zero in the presence of said color killer signal.

7. In a color television receiver an automatic gain control system as claimed in claim 1 including:

blanking means coupled to said second amplifier to reduce its said gain substantially to zero during horizontal blanking intervals.

8. In a color television receiver including 1. a first chroma amplifier providing intermediate chroma signals at its output terminal and having its gain controlled by an automatic chroma gain control responsive to the burst information component of said intermediate chroma signals and 2. chroma demodulators having their input terminal adapted to receive signals to be demodulated, which signals if their peak excursions were excessively large could cause oversaturation to occur in said receiver, in combination therewith the improvement comprising:

a second chroma amplifier having an input terminal coupled to said first chroma amplifier output terminal, having an output terminal coupled to said chroma demodulators input terminal for providing output chroma signals in response to said intermediate chroma signals applied to its said input, and being of variable gain between its said input and said output terminals as determined by a control signal applied to itself and, a peak detector having an input terminal coupled to said second chroma amplifier output terminal and having an output terminal at which at least a portion of said control signal is supplied in response to peak excursions of said output chroma signals which exceed a predetermined threshold level, which said improvement provides protection against said oversaturation.

9. In a color television receiver the improvement claimed in claim 8 wherein:

manual chroma gain control means is coupled to said second chroma amplifier to control its gain between its said input and said output terminals, said peak detector preventing peak excursions of said output chroma signals which could cause oversaturation and which tend to be caused by mis-setting of said manual chroma gain control means for too high gain of said second chroma amplifier.

10. In a color television receiver the improvement as claimed in claim 9 wherein said peak detector and said manual chroma gain control means are embodied in circuitry comprising:

a potentiometer having a first and a second end terminals respectively connected to an operating potential and to a reference potential and having a slider arm terminal;

a capacitor having a first end connected to be referred to said reference potential and having a second end at which potentials corresponding to said control signals are developed;

resistive means providing a direct-current path coupling said slider arm terminal and said second end of said capacitor;

a transistor having an emitter electrode connected to said reference potential, a collector electrode coupled to said second end of said capacitor, and a base electrode coupled to said second chroma amplifier output terminal and means to provide direct current biasing to the base electrode of said transistor sufficient to place said transistor into conduction only when augmented by sufficiently large signal excursions as coupled thereto from said second chroma amplifier output.

* * * * *